US006812587B2

(12) United States Patent
Gilbreth et al.

(10) Patent No.: US 6,812,587 B2
(45) Date of Patent: Nov. 2, 2004

(54) CONTINUOUS POWER SUPPLY WITH BACK-UP GENERATION

(75) Inventors: Mark G. Gilbreth, Simi Valley, CA (US); Everett R. Geis, Orange, CA (US); Claude Khalizadeh, San Ramon, CA (US); David McShane, Oak Park, CA (US); Joel B. Wacknov, Westlake, CA (US); Simon R. Wall, Thousand Oaks, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 159 days.

(21) Appl. No.: 10/300,936

(22) Filed: Nov. 21, 2002

(65) Prior Publication Data

US 2003/0111842 A1 Jun. 19, 2003

Related U.S. Application Data

(63) Continuation-in-part of application No. 10/072,501, filed on Feb. 5, 2002, now abandoned.
(60) Provisional application No. 60/276,352, filed on Mar. 16, 2001, provisional application No. 60/270,354, filed on Feb. 21, 2001, and provisional application No. 60/266,639, filed on Feb. 5, 2001.

(51) Int. Cl.[7] ................................................ H02P 9/00
(52) U.S. Cl. ............................ 290/52; 290/1 A; 290/7; 323/234; 307/64
(58) Field of Search ............................ 290/1 A, 2, 7, 290/52; 322/44, 100; 323/234, 268; 307/64

(56) References Cited

U.S. PATENT DOCUMENTS

| | | | | |
|---|---|---|---|---|
| 4,220,869 A | * | 9/1980 | Uram | 290/40 R |
| 4,697,090 A | | 9/1987 | Baker et al. | 290/4 R |
| 5,281,905 A | | 1/1994 | Dhyanchand et al. | 322/32 |
| 5,561,330 A | | 10/1996 | Crook | 290/30 R |
| 6,081,104 A | | 6/2000 | Kern | 323/268 |
| 6,265,786 B1 | * | 7/2001 | Bosley et al. | 290/52 |
| 6,281,595 B1 | | 8/2001 | Sinha et al. | 290/40 A |
| 6,437,535 B1 | | 8/2002 | Sinha | 318/800 |
| 6,495,929 B2 | * | 12/2002 | Bosley et al. | 290/52 |
| 6,512,966 B2 | * | 1/2003 | Lof et al. | 700/291 |
| 6,639,328 B2 | * | 10/2003 | Wacknov | 290/52 |
| 6,683,389 B2 | * | 1/2004 | Geis | 290/40 C |
| 6,713,892 B2 | * | 3/2004 | Gilbreth et al. | 290/52 |

FOREIGN PATENT DOCUMENTS

| | | |
|---|---|---|
| EP | 0472294 A1 | 2/1992 |
| WO | WO9618937 A1 | 6/1996 |
| WO | WO9932762 A1 | 7/1999 |
| WO | WO9952193 A1 | 10/1999 |
| WO | WO9960690 A1 | 11/1999 |
| WO | WO0028191 A2 | 5/2000 |

* cited by examiner

Primary Examiner—Nicholas Ponomarenko
(74) Attorney, Agent, or Firm—Sterne, Kessler, Goldstein & Fox PLLC (57) ABSTRACT

A continuous power supply may include a turbogenerator to provide power to supply the load and or an energy storage element and possibly also to the primary energy source. Utilizing an isolated DC bus architecture permits bi-directional power flow among interconnected elements.

40 Claims, 9 Drawing Sheets

CONTINUOUS POWER SUPPLY WITH BACK-UP GENERATION

RELATED APPLICATIONS

This application is a continuation-in-part of U.S. application Ser. No. 10/072,501, filed Feb. 5, 2002, now abandoned which claims the benefit of U.S. Provisional Application No. 60/266,639, filed Feb. 5, 2001, U.S. Provisional Application No. 60/270,354, filed Feb. 21, 2001, and U.S. Provisional Application No. 60/276,352, filed Mar. 16, 2001, each of which is incorporated by reference herein in its entirety.

FIELD OF THE INVENTION

This invention relates to continuous power systems, and more specifically to continuous power systems with back-up generation.

BACKGROUND OF THE INVENTION

What is needed is a turbogenerator based power supply with backup generation or an uninterruptable power supply.

SUMMARY OF THE INVENTION

The present invention comprises a standby system for supplying power to a network when a preferred power supply system is unavailable. The network includes a coupling device adapted to be coupled between the preferred power supply system and a load. A DC bus is adapted to be coupled to the coupling device and the load. A power converter is coupled to the DC bus, and an energy storage device is coupled to the power converter. An electric power supply is adapted to be coupled between the energy storage device and the power converter. A sensor senses the energy capacity of the energy storage device. A controller is coupled to the sensor and to the electric power supply for controlling the operation of the electric power supply as a function of the energy capacity sensed by the sensor.

In addition, the invention provides a power supply with back-up generation including a power source connected to a first bi-directional converter, a turbogenerator/motor connected to a second bi-directional converter, a load connected to a converter, a DC bus interconnecting each of the converters, an energy storage element connected to the DC bus, a bus sensor element connected to the DC bus, and a supervisory control receiving bus sensor signals for controlling the turbogenerator.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE INVENTION

Turbo Generator

Figure 1A:
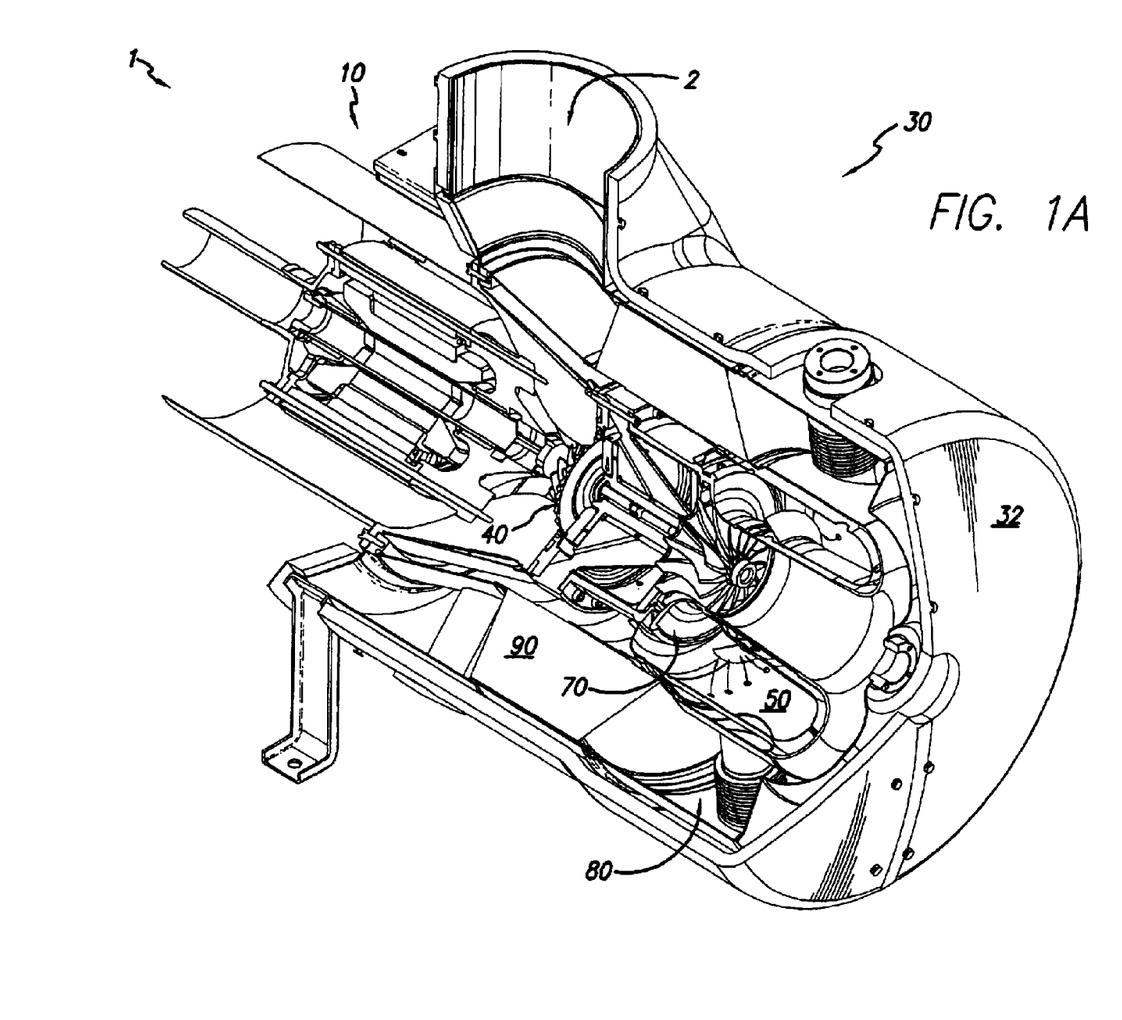
FIG. 1A is perspective view, partially in section, of an integrated turbogenerator system according to an embodiment of the invention.

With reference to FIG. 1A, an integrated turbogenerator 1 generally includes a motor/generator section 10 and a compressor-turbine section 30. Compressor-turbine section 30 includes an exterior can 32, a compressor 40, a combustor 50 and a turbine 70. A recuperator 90 may be optionally included.

Figure 1B:
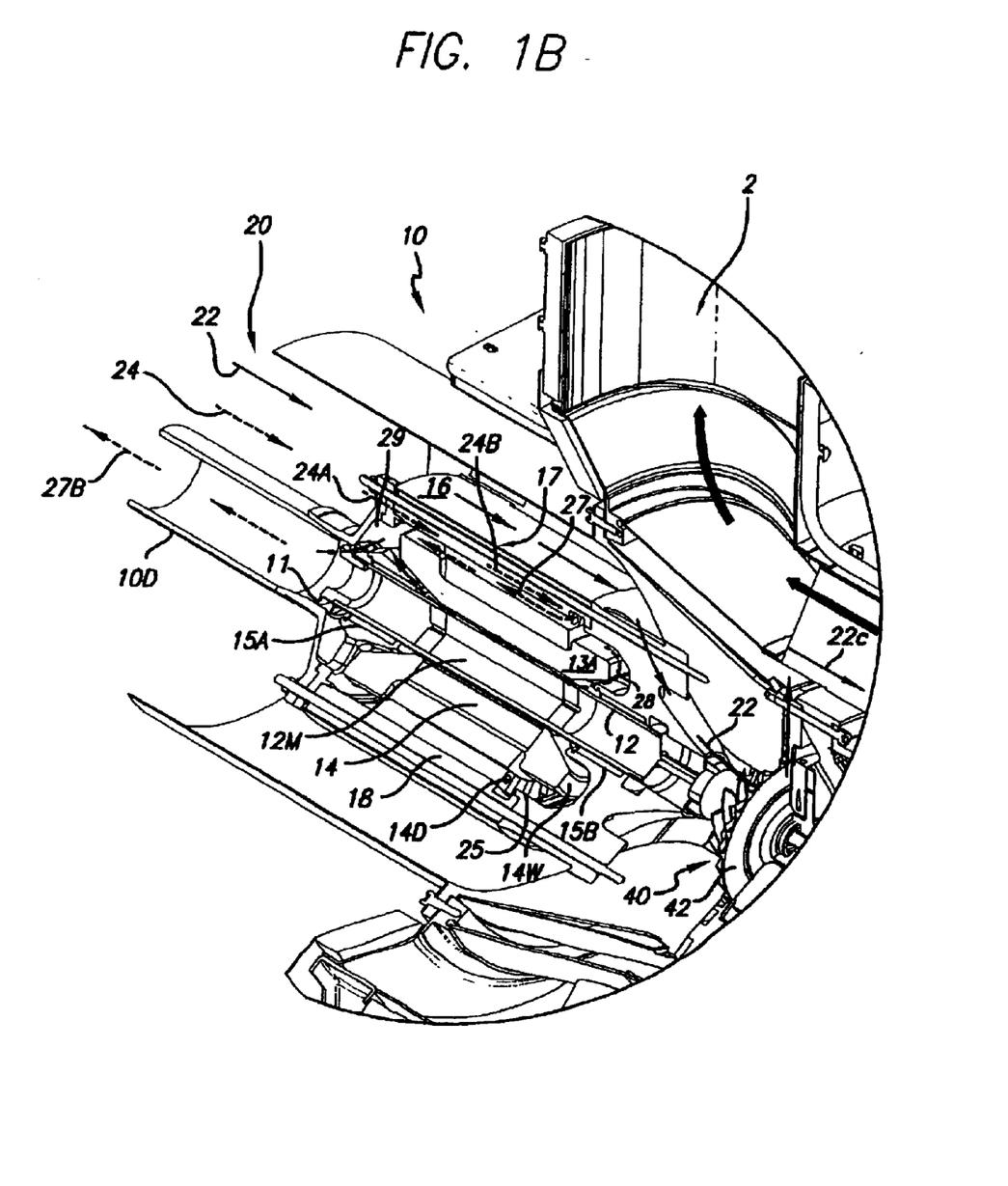
FIG. 1B is a magnified perspective view, partially in section, of the motor/generator portion of the integrated turbogenerator of FIG. 1A.
Figure 1C:
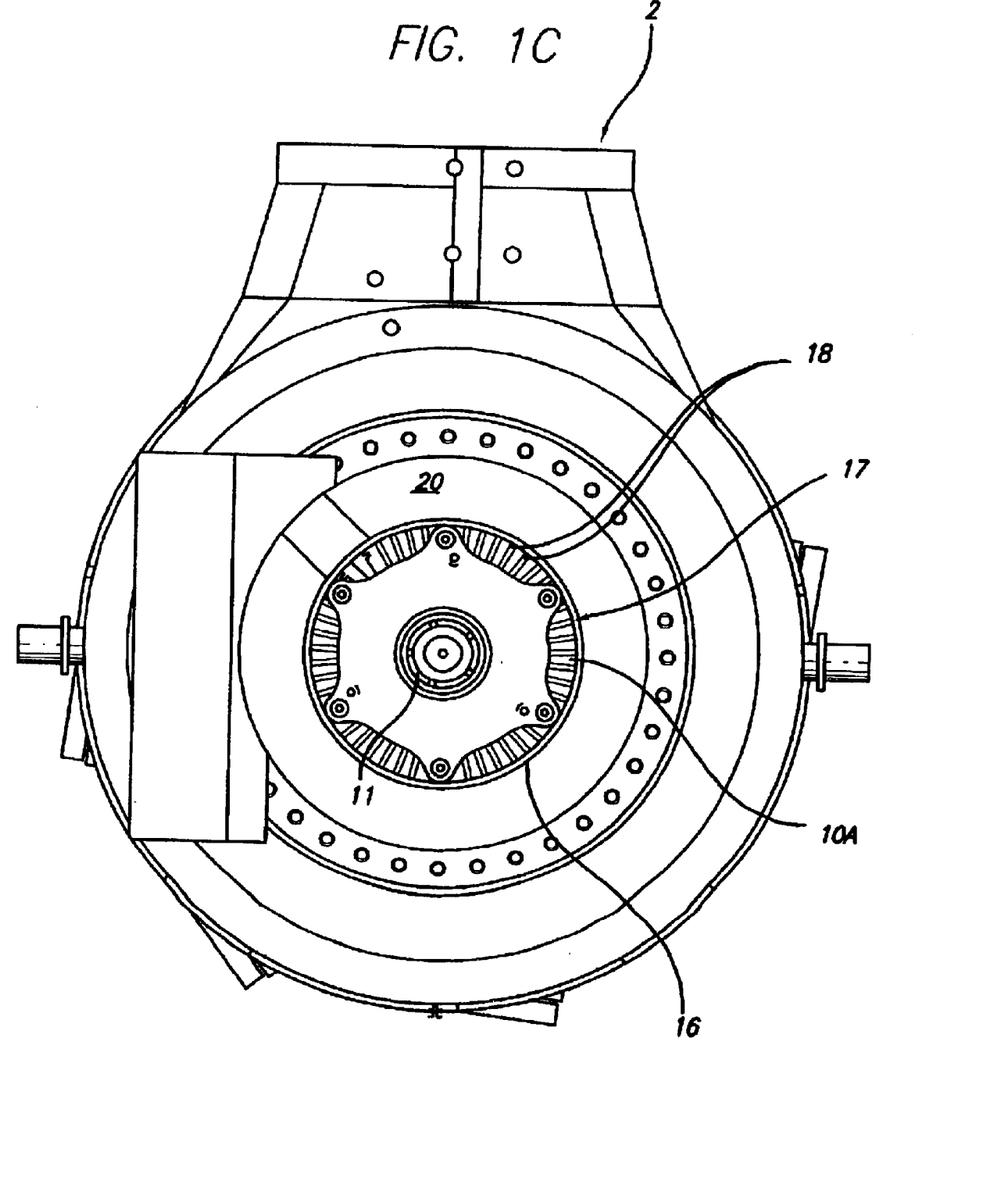
FIG. 1C is an end view, from the motor/generator end, of the integrated turbogenerator of FIG. 1A.

Referring now to FIG. 1B and FIG. 1C, motor/generator section 10 may comprise a permanent magnet motor generator having a permanent magnet rotor or sleeve 12. Any other suitable type of motor generator may also be used. Permanent magnet rotor or sleeve 12 may contain a permanent magnet 12M. Permanent magnet rotor or sleeve 12 and the permanent magnet 12M disposed therein are rotatably supported within a permanent magnet motor/generator stator 14. One or more compliant foil, fluid film, radial, or journal bearings 15A and 15B rotatably support permanent magnet rotor or sleeve 12 and the permanent magnet 12M disposed therein. All bearings, thrust, radial or journal bearings, in turbogenerator 1 may be fluid film bearings or compliant foil bearings. A motor/generator housing 16 encloses a stator heat exchanger 17 having a plurality of radially extending stator cooling fins 18. Stator cooling fins 18 connect to or form part of stator 14 and extend into an annular space 10A between motor/generator housing 16 and stator 14. Wire windings 14W are wound on permanent magnet motor/generator stator 14.

Figure 1D:
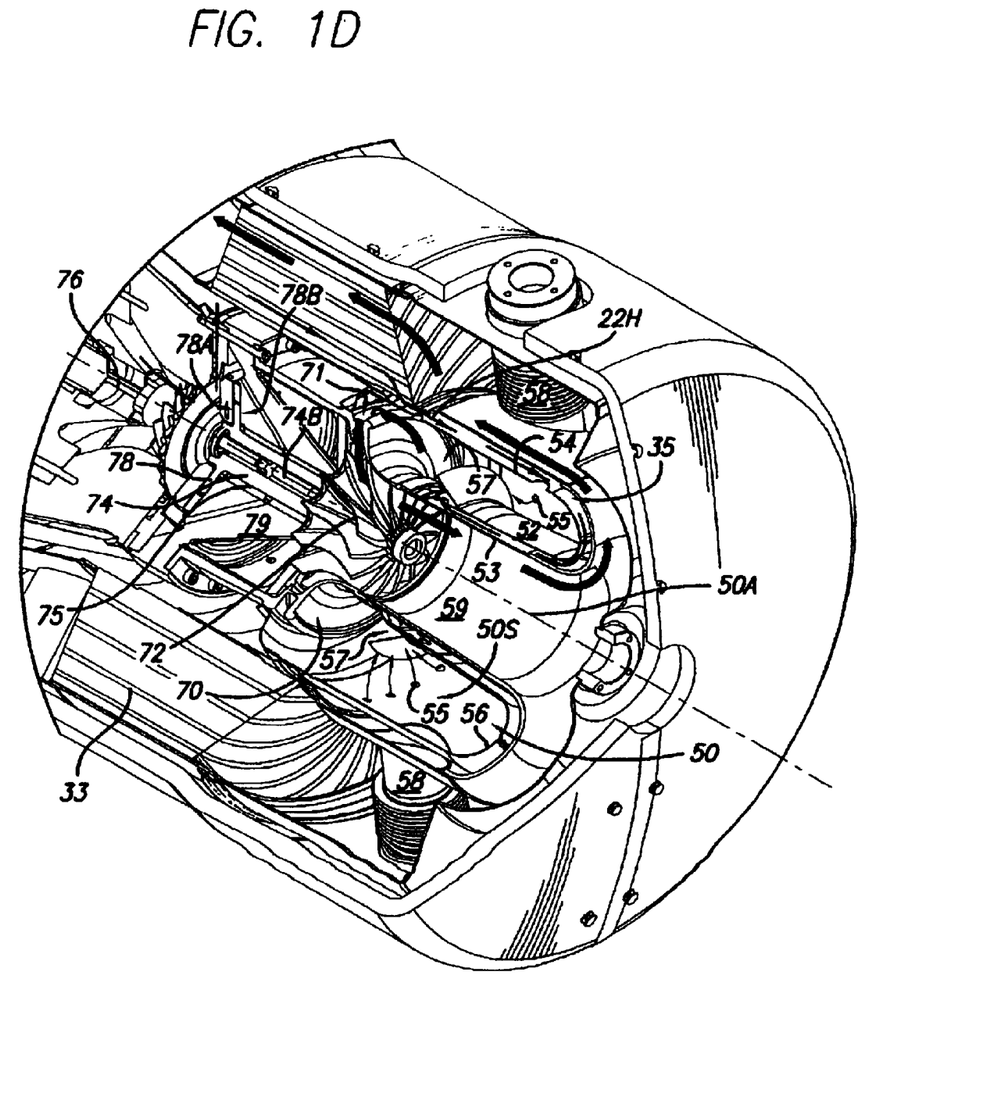
FIG. 1D is a magnified perspective view, partially in section, of the combustor-turbine exhaust portion of the integrated turbogenerator of FIG. 1A.
Figure 2:
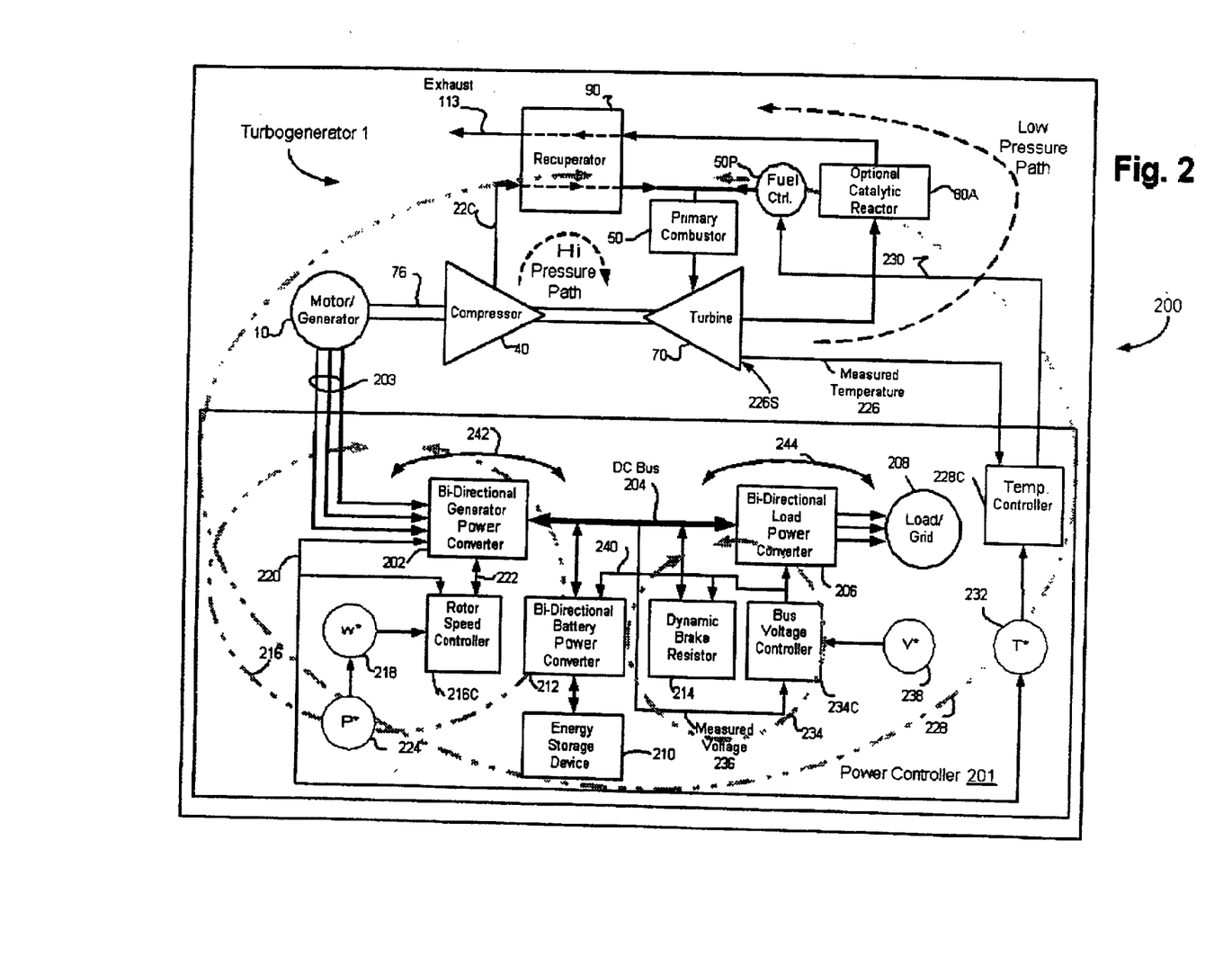
FIG. 2 is a block diagram schematic of a turbogenerator system including a power controller having decoupled rotor speed, operating temperature, and DC bus voltage control loops according to an embodiment of the invention.

Referring now to FIG. 1D, combustor 50 may include a cylindrical inner wall 52 and a cylindrical outer wall 54. Cylindrical outer wall 54 may also include air inlets 55. Cylindrical walls 52 and 54 define an annular interior space 50S in combustor 50 defining an axis 50A. Combustor 50 includes a generally annular wall 56 further defining one axial end of the annular interior space of combustor 50. One or more fuel injector inlets 58 may be associated with combustor 50 to accommodate fuel injectors which receive fuel from a fuel control element (or fuel pump) 50P as shown in FIG. 2, and inject fuel or a fuel air mixture to an interior 50S of combustor 50. An inner cylindrical surface 53 is interior to cylindrical inner wall 52 and forms an exhaust duct 59 for turbine 70.

Turbine 70 generally includes a turbine wheel 72. An end of combustor 50 opposite annular wall 56 further defines an aperture 71 in turbine 70 exposed to turbine wheel 72. A bearing rotor 74 may include a radially extending thrust bearing portion, bearing a rotor thrust disk 78, constrained by bilateral thrust bearings 78A and 78B. Bearing rotor 74 is rotatably supported by one or more journal bearings 75 within a center bearing housing 79. Bearing rotor thrust disk 78 at the compressor end of bearing rotor 74 is rotatably supported preferably by bilateral thrust bearings 78A and 78B. Journal or radial bearing 75 and thrust bearings 78A and 78B may be in the form of fluid film or foil bearings.

Turbine wheel 72, bearing rotor 74 and a compressor impeller 42 may be mechanically constrained by a tie bolt 74B, or other suitable technique, to rotate when turbine wheel 72 rotates. A mechanical link 76 mechanically constrains compressor impeller 42 to permanent magnet rotor or sleeve 12 and permanent magnet 12M disposed therein causing permanent magnet rotor or sleeve 12 and permanent magnet 12M to rotate when compressor impeller 42 rotates.

Figure 1E:
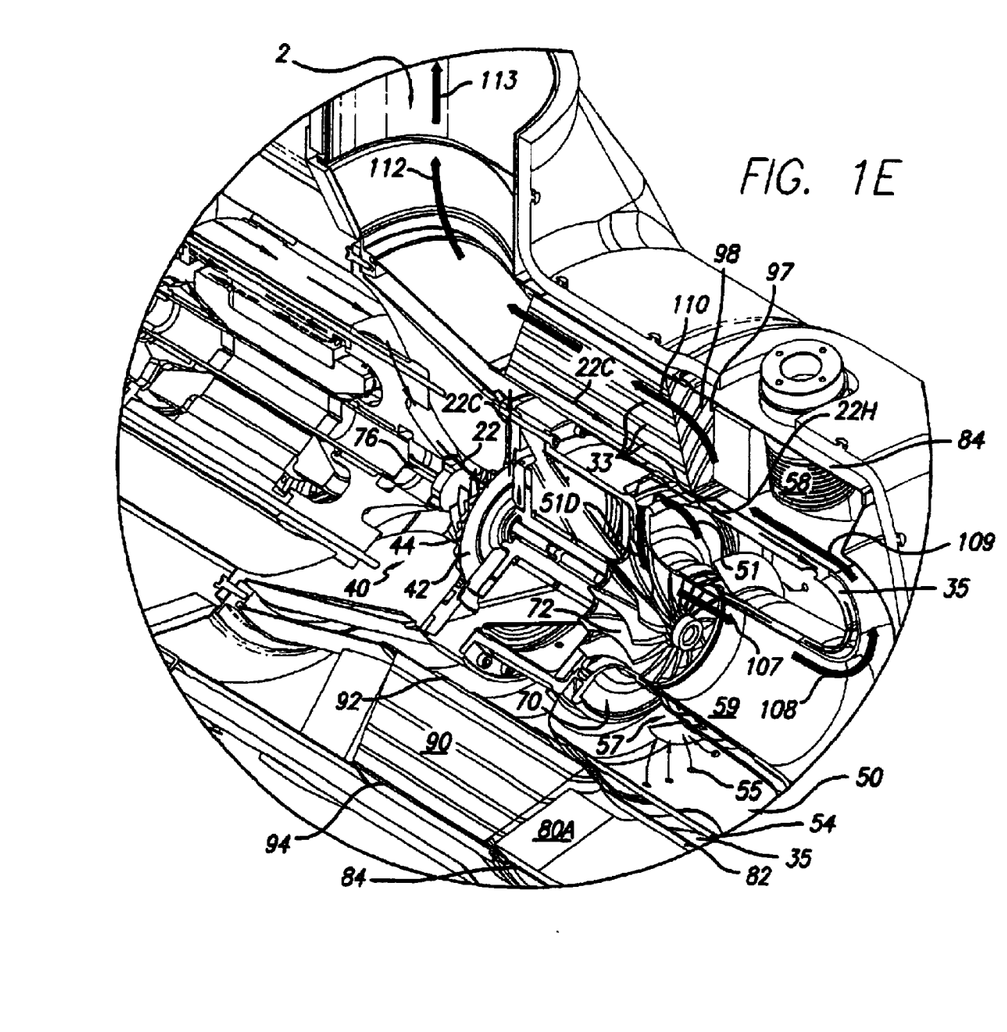
FIG. 1E is a magnified perspective view, partially in section, of the compressor-turbine portion of the integrated turbogenerator of FIG. 1A.

Referring now to FIG. 1E, compressor 40 may include compressor impeller 42 and a compressor impeller housing 44. Recuperator 90 may have an annular shape defined by a cylindrical recuperator inner wall 92 and a cylindrical recuperator outer wall 94. Recuperator 90 contains internal passages for gas flow. One set of passages 33 connects compressor 40 to combustor 50. A second set of passages 97 connects a turbine exhaust 80 to a turbogenerator exhaust output 2.

Referring again to FIG. 1B and FIG. 1C, in operation, air flows into a primary inlet 20 and divides into compressor air 22 and motor/generator cooling air 24. Motor/generator cooling air 24 flows into an annular space 10A between motor/generator housing 16 and permanent magnet motor/generator stator 14 along a flow path 24A. Heat is exchanged from stator cooling fins 18 to generator cooling air 24 in flow path 24A, thereby cooling stator cooling fins 18 and stator 14 and forming heated air 24B. Warm stator cooling air 24B exits stator heat exchanger 17 into a stator cavity 25 where it further divides into stator return cooling air 27 and rotor cooling air 28. Rotor cooling air 28 passes around a stator end 13A and travels along rotor or sleeve 12. Stator return cooling air 27 enters one or more cooling ducts 14D and is conducted through stator 14 to provide further cooling. Stator return cooling air 27 and rotor cooling air 28 rejoin in a stator cavity 29 and are drawn out of motor/generator 10 by an exhaust fan 11 which is connected to rotor or sleeve 12 and rotates with rotor or sleeve 12. Exhaust air 27B is conducted away from primary air inlet 20 by a duct 10D.

Referring again to FIG. 1E, compressor 40 receives compressor air 22. Compressor impeller 42 compresses compressor air 22 and forces compressed gas 22C to flow into a set of passages 33 in recuperator 90 connecting compressor 40 to combustor 50. In passages 33 in recuperator 90, heat is exchanged from walls 98 of recuperator 90 to compressed gas 22C. As shown in FIG. 1E, heated compressed gas 22H flows out of recuperator 90 to space 35 between cylindrical inner surface 82 of turbine exhaust 80 and cylindrical outer wall 54 of combustor 50. Heated compressed gas 22H may flow into combustor 54 through sidewall ports 55 or main inlet 57. Fuel (not shown) may be reacted in combustor 50, converting chemically stored energy to heat. Hot compressed gas 51 in combustor 50 flows through turbine 70 forcing turbine wheel 72 to rotate. Movement of surfaces of turbine wheel 72 away from gas molecules partially cools and decompresses gas 51D moving through turbine 70. Turbine 70 is designed so that exhaust gas 107 flowing from combustor 50 through turbine 70 enters cylindrical passage 59. Partially cooled and decompressed gas in cylindrical passage 59 flows axially in a direction away from permanent magnet motor/generator section 10, and then radially outward, and then axially in a direction toward permanent magnet motor/generator section 10 to passages 97 of recuperator 90, as indicated by gas flow arrows 108 and 109 respectively.

As an additional optional feature, a low pressure catalytic reactor 80A may be included between fuel injector inlets 58 and recuperator 90. Low pressure catalytic reactor 80A may include internal surfaces (not shown) having catalytic material (e.g., Pd or Pt, not shown) disposed on them. Low pressure catalytic reactor 80A may have a generally annular shape defined by a cylindrical inner surface 82 and a cylindrical low pressure outer surface 84. Unreacted and incompletely reacted hydrocarbons in gas in low pressure catalytic reactor 80A react to convert chemically stored energy into additional heat, and to lower concentrations of partial reaction products, such as harmful emissions including nitrous oxides (NOx).

Gas 110 flows through passages 97 in recuperator 90 connecting from turbine exhaust 80 or catalytic reactor 80A to turbogenerator exhaust output 2, as indicated by gas flow arrow 112, and then exhausts from turbogenerator 1, as indicated by gas flow arrow 113. Gas flowing through passages 97 in recuperator 90 connecting from turbine exhaust 80 to the exterior of turbogenerator 1 exchanges heat to walls 98 of recuperator 90. Walls 98 of recuperator 90 heated by gas flowing from turbine exhaust 80 exchange heat to gas 22C flowing in recuperator 90 from compressor 40 to combustor 50.

Turbogenerator 1 may also include various electrical sensor and control lines for providing feedback to power controller 201 and for receiving and implementing control signals. The electrical sensor and control systems are shown in FIG. 2 and discussed in more detail below.

The integrated turbogenerator disclosed above is exemplary. Several alternative structural embodiments are described below.

In one alternative embodiment, a gaseous fuel mixture may replace air 22. In this embodiment, fuel injectors may not be necessary. This embodiment may include an air and fuel mixer upstream of compressor 40.

In another alternative embodiment, a fuel conduit connecting to compressor impeller housing 44 may conduct fuel directly to compressor 40, for example. Fuel and air may be mixed by action of the compressor impeller 42. In this embodiment, fuel injectors may not be necessary.

In another alternative embodiment, combustor 50 may be a catalytic combustor.

In still another alternative embodiment, geometric relationships and structures of components may differ from those shown in FIG. 1A. Permanent magnet motor/generator section 10 and compressor/combustor section 30 may have low pressure catalytic reactor 80A outside of annular recuperator 90, and may have recuperator 90 outside of low pressure catalytic reactor 80A. Low pressure catalytic reactor 80A may be disposed at least partially in cylindrical passage 59, or in a passage of any shape confined by an inner wall of combustor 50. Combustor 50 and low pressure catalytic reactor 80A may be substantially or completely enclosed with an interior space formed by a generally annularly shaped recuperator 90, or a recuperator 90 shaped to substantially enclose both combustor 50 and low pressure catalytic reactor 80A on all but one face.

An integrated turbogenerator is a turbogenerator in which the turbine, compressor, and generator are all constrained to rotate based upon rotation of the shaft to which the turbine is connected. The methods and apparatus disclosed herein are preferably but not necessarily used in connection with a turbogenerator, and are preferably but not necessarily used in connection with an integrated turbogenerator.

Control System

Referring now to FIG. 2, a turbogenerator system 200 includes a power controller 201 which has three substantially decoupled control loops for controlling (1) rotary speed, (2) temperature, and (3) DC bus voltage. A more detailed description of an appropriate power controller is disclosed in U.S. patent application Ser. No. 09/207,817, filed Dec. 08, 1998 in the names of Gilbreth, Wacknov and Wall, and assigned to the assignee of the present application. The disclosure of the '817 application is incorporated herein in its entirety by this reference as though set forth in full hereafter.

Referring still to FIG. 2, turbogenerator system 200 includes integrated turbogenerator 1 and power controller 201. Power controller 201 includes three decoupled or independent control loops.

A first control loop, temperature control loop 228, regulates a temperature related to the desired operating temperature of primary combustor 50 to a set point, by varying fuel flow from fuel control element 50P to primary combustor 50. A temperature controller 228C receives a temperature set point, T*, from a temperature set point source 232, and receives a measured temperature from a temperature sensor 226S connected to a measured temperature line 226. Temperature controller 228C generates and transmits over a fuel control signal line 230 to fuel pump 50P a fuel control signal for controlling the amount of fuel supplied by fuel pump 50P to primary combustor 50. The fuel is controlled to an amount intended to result in a desired operating temperature in primary combustor 50. A temperature sensor 226S may directly measure the temperature in primary combustor 50 or may measure a temperature of an element or area from which the temperature in the primary combustor 50 may be inferred.

A second control loop, speed control loop 216, controls speed of the shaft common to the turbine 70, compressor 40, and motor/generator 10, hereafter referred to as the common shaft, by varying torque applied by the motor generator to the common shaft. Torque applied by the motor generator to the common shaft depends upon power or current drawn from or pumped into windings of motor/generator 10. A bi-directional generator power converter 202 is controlled by a rotor speed controller 216C to transmit power or current into or out of motor/generator 10, as indicated by a bi-directional arrow 242. A sensor in turbogenerator 1 senses the rotary speed on the common shaft and transmits that rotary speed signal over a measured speed line 220. Rotor speed controller 216C receives the rotary speed signal from measured speed line 220 and a rotary speed set point signal from a rotary speed set point source 218. Rotary speed controller 216C generates and transmits to generator power converter 202 a power conversion control signal on a line 222 controlling generator power converter 202's transfer of power or current between AC lines 203 (i.e., from motor/generator 10) and a DC bus 204. Rotary speed set point source 218 may convert a power set point P* to the rotary speed set point received from a power set point source 224.

A third control loop, voltage control loop 234, controls bus voltage on DC bus 204 to a set point by transferring power or voltage between DC bus 204 and any of (1) a Load/Grid 208 and/or (2) an energy storage device 210, and/or (3) by transferring power or voltage from DC bus 204 to a dynamic brake resistor 214. A sensor measures voltage on DC bus 204 and transmits a measured voltage signal over a measured voltage line 236. A bus voltage controller 234C receives the measured voltage signal from voltage line 236 and a voltage set point signal V* from a voltage set point source 238. Bus voltage controller 234C generates and transmits signals to a bi-directional load power converter 206 and a bi-directional battery power converter 212 controlling the transmission of power or voltage between DC bus 204, load/grid 208, and energy storage device 210, respectively. In addition, bus voltage controller 234 transmits a control signal to control connection of dynamic brake resistor 214 to DC bus 204.

Power controller 201 regulates temperature to a set point by varying fuel flow, adds or removes power or current to motor/generator 10 under control of generator power converter 202 to control rotor speed to a set point as indicated by bi-directional arrow 242, and controls bus voltage to a set point by (1) applying or removing power from DC bus 204 under the control of load power converter 206 as indicated by bi-directional arrow 244, (2) applying or removing power from energy storage device 210 under the control of battery power converter 212, and (3) by removing power from DC bus 204 by modulating the connection of dynamic brake resistor 214 to DC bus 204.

The method and apparatus disclosed above contain elements interchangeable with elements of the methods and apparatus below.

Figure 3:
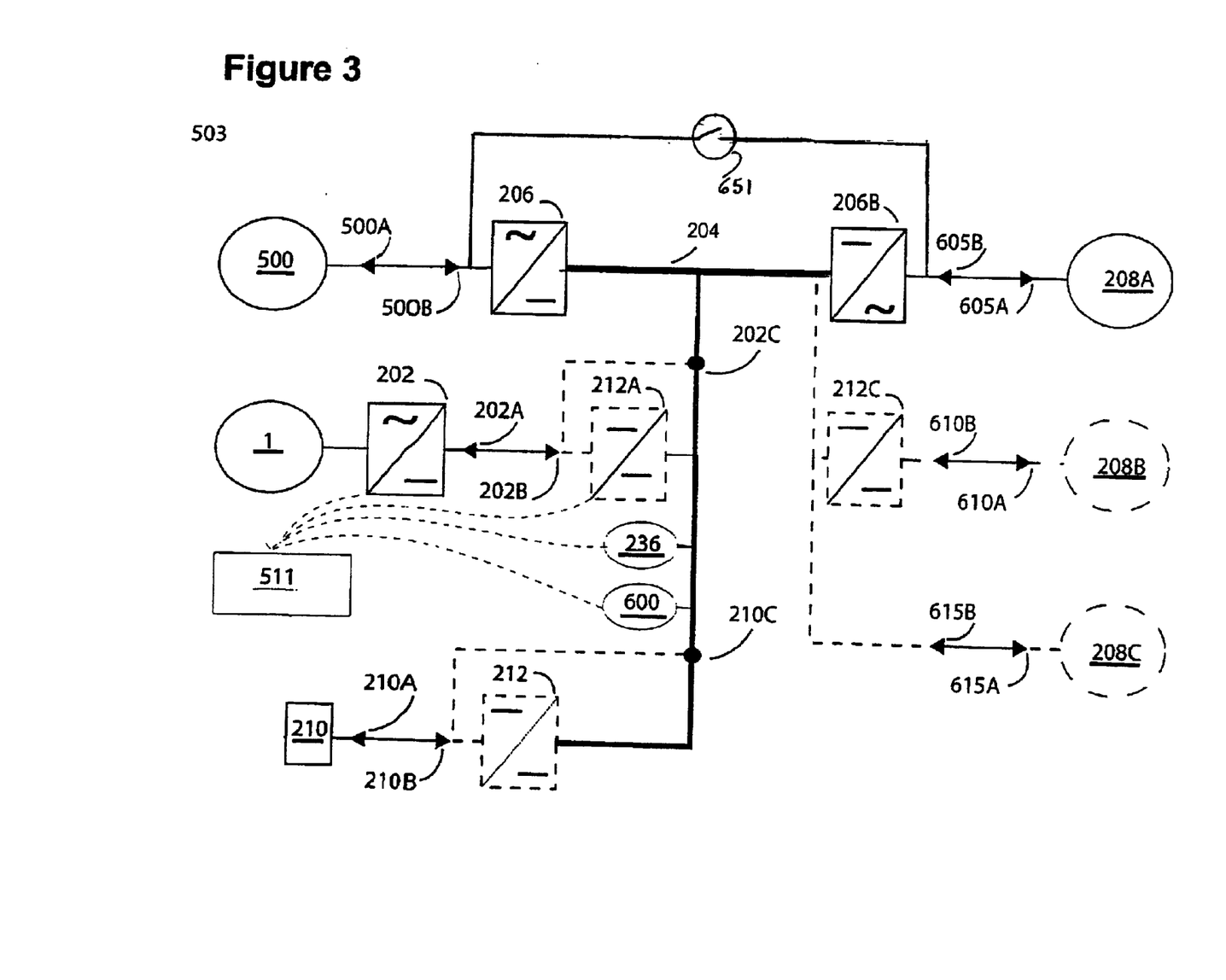
FIG. 3 is a block diagram schematic of a first example continuous power supply system with back-up generation according to an embodiment of the invention.

Referring now to FIG. 3, power supply 503 is shown combining a power source 500 with turbogenerator 1. Power source 500 is connected to bi-directional load power converter 206 that is connected to DC bus 204. Power Source 500 may be a utility grid, a local power network, or another power distribution, power storage, or power generation system. Bi-directional converter 206 enables power source 500 to either supply power 500B to, or to consume power 500A from DC bus 204.

FIG. 3 also shows turbogenerator 1 connected to bi-directional generator power converter 202. Converter 202 is connected to bi-directional power converter 212A, which, in turn, is connected to DC bus 204. Bi-directional converters 202 and 212A enable turbogenerator 1 to either supply power 202B to, or to consume power 202A from, DC bus 204. Converter 202 may be connected directly to DC bus 204 if converter 202 is designed to operate within the range of DC bus voltages 236 present on DC bus 204. Direct connection 202C of converter 202 to DC bus 204 would eliminate the need for converter 212A.

FIG. 3 also shows AC load 208A connected to converter 206B that is connected to DC bus 204. Load 208A may consume power, indicated by flow arrow 605A, from DC bus 204. In the alternative, converter 206B may be a bi-directional converter and load 208A may supply power 605B to DC bus 204.

FIG. 3 also shows DC load 208B on DC bus 204. Load 208B is connected to converter 212C that is connected to DC bus 204. Load 208B may consume power 610A from DC bus 204. In the alternative, converter 212C may be a bi-directional converter and Load 208B may supply power 610B to DC bus 204.

FIG. 3 also shows DC load 208C on DC bus 204. Load 208C is connected to DC bus 204. Load 208C may consume power 615A from DC bus 204. In the alternative, load 208C may supply power 615B to DC bus 204.

FIG. 3 also shows energy storage 210 connected to bi-directional battery power converter 212 that is connected to DC bus 204. Bi-directional converter 212 enables energy storage 210 to supply power 210B to the DC bus 204, or to consume power 210A from the DC bus 204. Energy storage 210 may be connected directly to the DC bus 204 if energy storage 210 is designed to operate within the range of DC bus voltages 236 present on DC bus 204. The direct connection 210C of energy storage 210 to DC bus 204 would eliminate the need for converter 212.

FIG. 3 also shows a bus sensor 600 connected to DC bus 204 between DC bus connection 210C and DC bus voltage measurement 236. Bus sensor 600 may be used to measure bus status including the flow of power 210A to, and the flow of power 210B from, energy storage 210.

FIG. 3 also shows a supervisory controller 511. Controller 511 may be comprised of a plurality of processing elements. Controller 511 may have connections to bus sensor 600, voltage sensor 236, turbogenerator 1, converter 202, and converter 212A. Controller 511 may also include functions comprising turbogenerator start, operation, stop, fault, and reporting/diagnostics.

In one embodiment, converter 202 and energy storage 210 may be connected directly to the DC bus. In an alternate embodiment, converter 202 may be connected directly to the DC bus and energy storage 210 may be connected to converter 212. In a third embodiment, energy storage 210 may be connected directly to the DC bus and converter 202 may be connected to converter 212A.

In a first mode of operation, power source 500 supplies power 500B to DC bus 204, enabling DC bus voltage to be controlled within a prescribed range. If power source 500 is unable to supply sufficient power to the DC bus 204 to maintain DC bus voltage at a required level, then DC bus 204 draws power 2101B from energy storage 210. Bus sensor 600 senses the flow of power 210B from energy storage. Supervisory controller 511 starts turbogenerator 1 when the flow of power 2101B from energy storage 210 exceeds prescribed limits. Turbogenerator 1 consumes power 202A, from DC bus 204 during start. After reaching self-sustaining speed, turbogenerator 1 supplies power 202B to DC Bus 204 and power exchange between DC bus 204 and energy storage 210 reverses as energy storage 210 is recharged by the flow of power 210A from DC bus 204.

In a second mode of operation, turbogenerator 1 may be supplying power 202B to the DC bus 204. Load 208 may be consuming power 605A from DC bus 204 and power supply 500 may be consuming power 500A from DC bus 204.

In a third mode of operation, one or more of loads 208 may be supplying power to the DC bus as indicated by one or more of power arrows 605B, 610B, and or 615B respectively.

Figure 4:
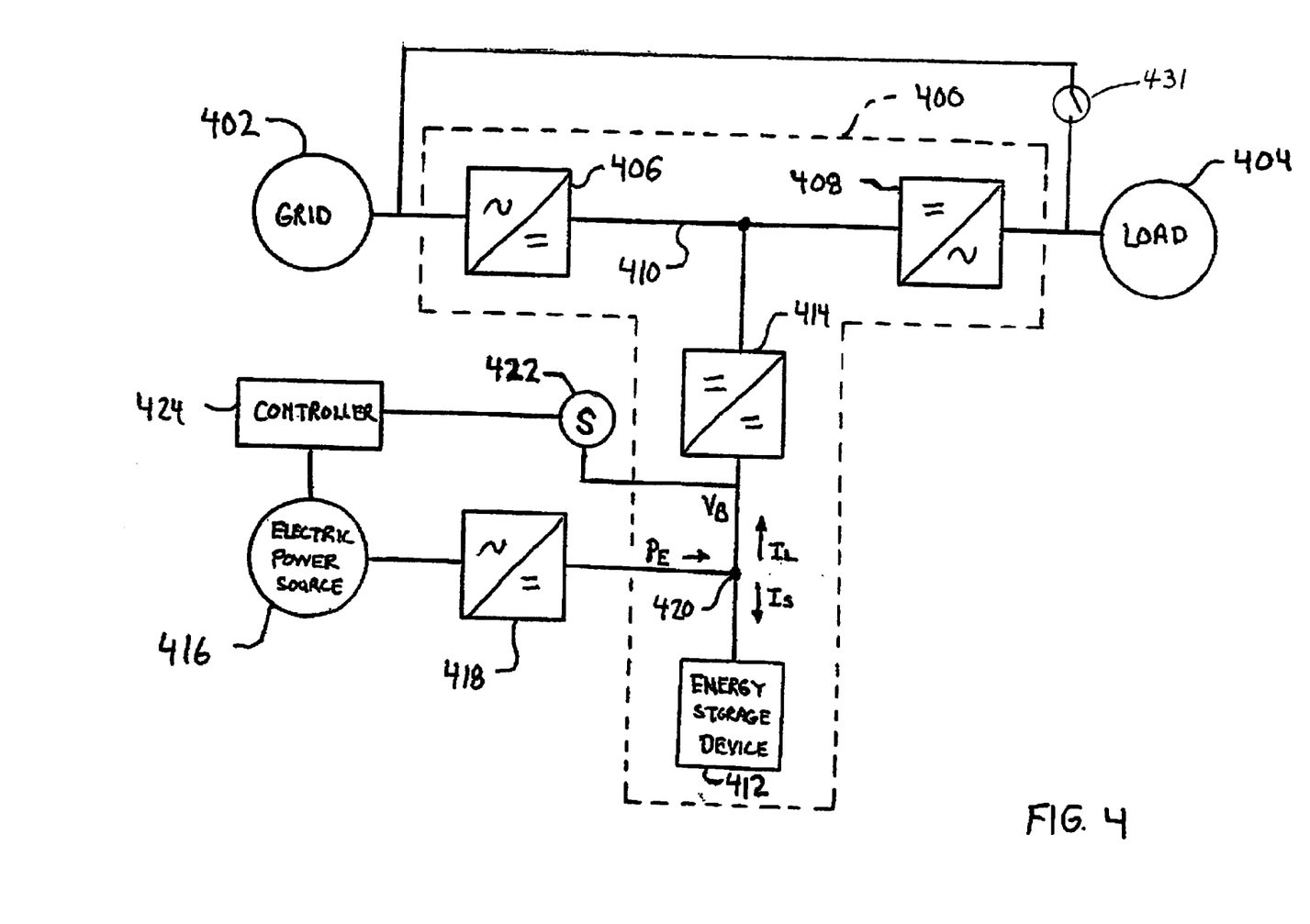
FIG. 4 is a block diagram schematic of a second example continuous power supply system with back-up generation.

A further embodiment of the power control system according to the invention is illustrated in FIG. 4. FIG. 4 shows a block diagram schematic of an in-line uninterruptable power supply (UPS) having an electric power source for recharging an energy storage device. More specifically, FIG. 4 shows a UPS system 400 comprising a primary power source 402, such as a utility power grid, coupled to a load 404 through a first bi-directional power converter 406, a second bi-directional power converter 408, and a DC bus 410. An energy storage device 412 is connected to DC bus 410 through an optional DC/DC converter 414. An electric power supply 416 is connected through a further converter 418 to a node 420 between energy storage device 412 and optional converter 414. If power supply 416 produces an AC power signal, such as a turbogenerator/motor or wind turbine, convertor 418 is typically a bi-directional AC/DC converter. If power supply 416 produces a DC output, such as a fuel cell or a photovoltaic cell, then converter would either be omitted or is typically a DC/DC converter. A sensor 422 is connected to DC bus 410 preferably at or near node 420. Sensor 422 monitors conditions on bus 410 and sends information to a controller 424. Controller 424 is connected to electric power supply 416 to control the operation of electric power supply 416 as a function of the sensed conditions on bus 410.

Electric power supply 416 may comprise any of a number of types of power sources. These may include a turbogenerator/motor, a fuel cell, a wind turbine, or photovoltaic cells. Energy storage device 412 may comprise a battery or an ultracapacitor, for example. Sensor 422 may comprise a voltage sensor for sensing the voltage at energy storage device 412 or a current sensor for sensing current into and out of energy storage device 412, for example.

In one example of the embodiment of FIG. 4, sensor 422 comprises a voltage sensor; electric power supply 416 comprises a turbogenerator/motor; and energy storage device 412 comprises a battery. In a typical example, load 404 draws power from the primary power source, such as an electric utility grid, 402. A failure of primary power source 402 causes load 404 to start drawing power from the energy storage device, such as a battery, 412. As power is drawn from energy storage device 412, the voltage on bus 410 decreases. This decrease is sensed by (voltage) sensor 422. If sensor 422 senses a drop in DC bus voltage below a preset threshold, it will send a signal to controller 424. Controller 424 sends a START command to turbogenerator/motor 416 to command it to start up. Typically, controller 424 waits for a predetermined period of time, usually on the order of 60–90 seconds, before sending the START command to allow for momentary fluctuations in power source 402.

At the START command, current is caused to flow from battery 412 through converter 418 to turbogenerator/motor 416 to provide starting power for turbogenerator/motor 416. Once turbogenerator/motor 416 has started and become self-sustaining, it reverts to generator mode and puts power back into the system. This operation is understood by persons skilled in the relevant art, and is described, for example, in the above-mentioned '817 application. Where energy storage device 412 is a battery or equivalent rechargeable device, part of the output current from turbogenerator/motor 416 goes to recharge storage device 412. The remaining output current is supplied to DC bus 410 to provide power to load 404. Once storage device 412 is recharged, turbogenerator/motor 416 continues to provide power to load 404 via DC bus 410 until primary power source 402 comes back on line.

A feature of this embodiment is its simplicity. The operation of turbogenerator/motor 416 is controlled by a single voltage (or current) sensor 422. Sensor 422 only needs to measure the voltage (or current) on DC bus 410. If sensor 422 detects an adverse voltage or current change on bus 410 for a predetermined period of time, it sends a signal to controller 424 to cause turbogenerator/motor 416 to supply power until primary power source 402 comes back on line.

Figure 5:
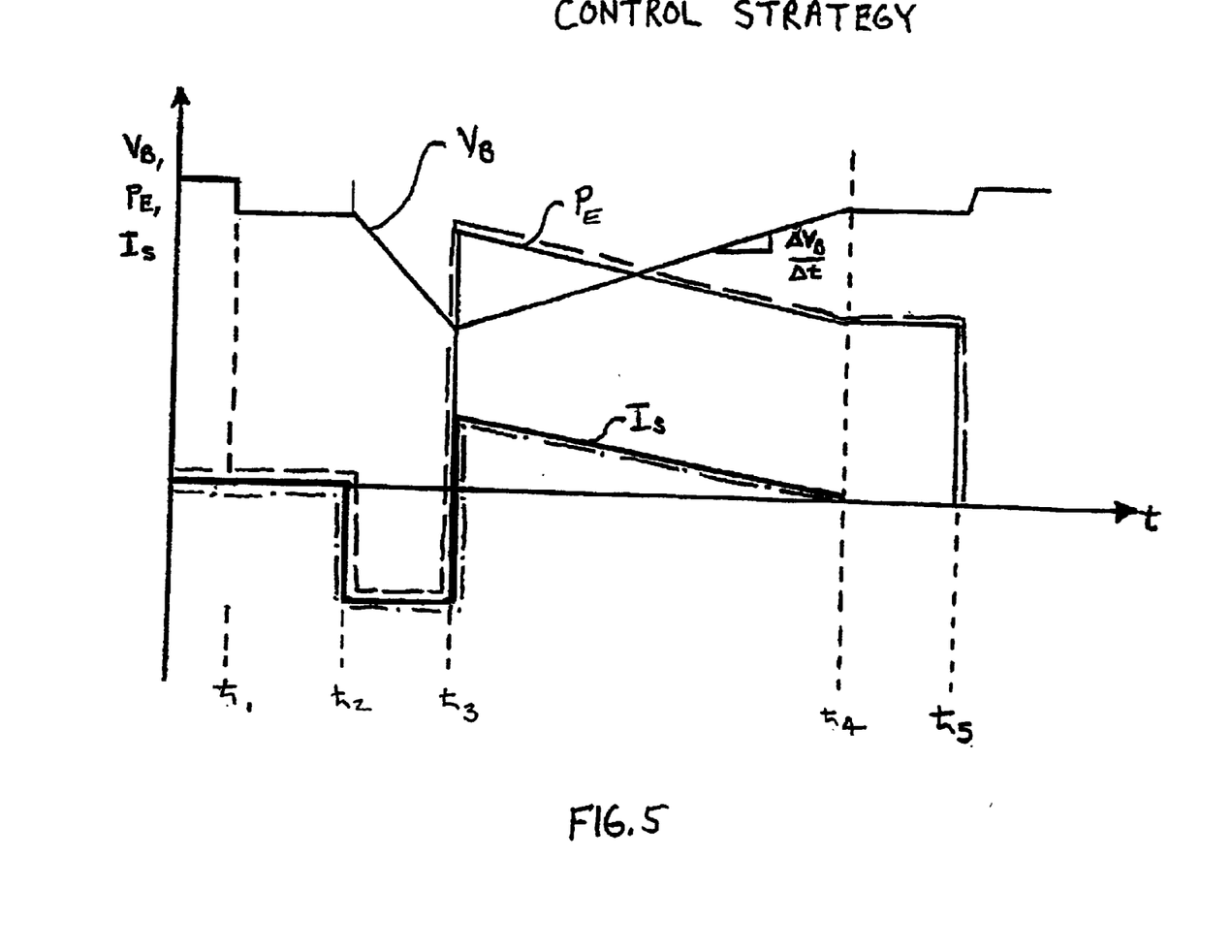
FIG. 5 is a graphic illustration of an example control strategy for a continuous power supply system with back-up generation according to an embodiment of the invention.

The operation of the embodiment of FIG. 4 is further illustrated by the graph of FIG. 5. At a time $t_1$, voltage sensor 422 senses a drop in voltage $V_B$ across DC bus 420. Sensor 422 detects the continuous drop in voltage due to the failure of primary source 402 and the corresponding drain on battery 412. At a predetermined time $t_2$ after time $t_1$, controller 424 sends a START command to turbogenerator/motor 416 to initiate a start sequence. Once turbogenerator/motor 416 has reached its self-sustaining operating condition and is generating power, which occurs very rapidly, between times $t_2$ and $t_3$, turbogenerator/motor 416 supplies power PE to load 404 and a charging current Is to battery 412. The rate of charging of battery 412 is a function of several factors, including the size and number of battery cells. These factors can be programmed into controller 424 during initial system setup. In one example, the rate of charging of battery 412 (e.g., $\Delta V_B/\Delta t$) is controlled. At time $t_4$, battery 412 is fully charged and turbogenerator/motor 416 continues to provide power to load 404. At time $t_5$, primary power source 402 comes back on line. This may be detected by a small voltage spike on DC bus 410. This spike is detected by voltage sensor 422, which sends this information to controller 424. Controller 424 then sends a SHUT DOWN command to turbogenerator/motor 416 to cause it to shut down.

In a variation of the foregoing embodiment, controller 424 can be programmed to send a START command to turbogenerator/motor 416 at predetermined times. For example, turbogenerator/motor 416 can be programmed to turn on at certain times of the day, such as when electric utility rates are high. Turbogenerator/motor 416 can then provide power to supplement or replace utility grid power.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A power supply with back-up generation comprising:
   a power source connected to a first bi-directional converter;
   a turbogenerator connected to a second bi-directional converter;
   a load connected to a converter;
   a DC bus interconnecting each of the converters;
   an energy storage element connected to the DC bus;
   a bus sensor element connected to the DC bus, providing bus status signals; and
   a controller receiving bus status signals for controlling said turbogenerator.

2. The power supply of claim 1 wherein the bus status signals further comprise:
   DC bus voltage; and
   energy storage element current flow.

3. The power supply of claim 1 wherein the controller further comprises:
   a decoupled speed control loop;
   a decoupled temperature control loop; and
   a decoupled power control loop.

4. A method of providing uninterruptable power to a load comprising:
   providing a primary power source isolated by a first bi-directional power converter;
   providing a turbogenerator isolated by a second bi-directional power converter;
   providing a load isolated by a power converter;
   interconnecting each of the isolation power converters with a DC bus;
   connecting an energy storage element to the DC bus;
   monitoring the status of the DC bus and providing the status signals to the controller; and
   controlling the turbogenerator using bus status signals.

5. A standby system for supplying power to a network when a preferred power supply system is unavailable, the network including a coupling device adapted to be coupled between the preferred power supply system and a load, a DC bus adapted to be coupled to and between the coupling device and the load, a power converter coupled to the DC bus, and an energy storage device coupled to the power converter, comprising:
   an electric power supply adapted to be coupled between the energy storage device and the power converter;
   a sensor for sensing energy capacity of the energy storage device; and
   a controller coupled to said sensor and to said electric power supply for controlling the operation of said electric power supply as a function of energy capacity sensed by said sensor.

6. The standby system according to claim 5, wherein said electric power supply comprises a turbogenerator/motor.

7. The standby system according to claim 5, wherein said electric power supply comprises a fuel cell.

8. The standby system according to claim 5, wherein said electric power supply comprises a wind turbine.

9. The standby system according to claim 5, wherein said electric power supply comprises photovoltaic cells.

10. The standby system according to claim 5, wherein said sensor comprises a voltage sensor for sensing voltage at the energy storage device.

11. The standby system according to claim 5, wherein said sensor comprises a current sensor for sensing current into or out of the energy storage device.

12. An uninterruptable continuous power supply system, comprising:
    a first power converter adapted to be coupled to a primary power source;
    a second power converter adapted to be coupled to a load;
    a DC bus coupled to and between the first and second power converters;
    an energy storage device coupled to the DC bus;
    an electric power supply coupled between the energy storage device and the DC bus;
    a sensor for sensing energy capacity of the energy storage device; and
    a controller coupled to said sensor and to said electric power supply for controlling the operation of said electric power supply as a function of energy capacity sensed by said sensor.

13. The system according to claim 12, wherein said electric power supply comprises a turbogenerator/motor.

14. The system according to claim 12, wherein said electric power supply comprises a fuel cell.

15. The system according to claim 12, wherein said electric power supply comprises a wind turbine.

16. The system according to claim 12, wherein said electric power supply comprises photovoltaic cells.

17. The system according to claim 12, wherein said sensor comprises a voltage sensor for sensing voltage at the energy storage device.

18. The system according to claim 12, wherein said sensor comprises a current sensor for sensing current into or out of the energy storage device.

19. The system according to claim 12, wherein said energy storage device comprises a battery.

20. The system according to claim 12, wherein said energy storage device comprises a ultracapacitor.

21. The system according to claim 12, wherein said energy storage device comprises a flywheel.

22. The system according to claim 12, further comprising a further power converter coupled between said electric power supply and said DC bus.

23. The system according to claim 22, wherein said further power converter is coupled to said energy storage device.

24. An uninterruptable continuous power supply system, comprising:
    a first AC/DC bi-directional power converter, adapted to be coupled to a primary power source;

a second AC/DC bi-directional power converter, adapted to be coupled to a load;

a DC bus coupled to and between said first and second power converters;

a secondary power source coupled to said DC bus between said first and second power converters;

a turbogenerator/motor coupled to and between said secondary power source and said DC bus;

a voltage sensor for sensing voltage at said secondary power source; and a controller coupled to said voltage sensor and to said turbogenerator/motor for controlling the operation of said turbogenerator/motor as a function of voltage detected by said voltage sensor.

25. A method for supplying power to a network when a preferred power supply system is unavailable, wherein the network includes a coupling device adapted to be coupled between the preferred power supply system and a load, a DC bus adapted to be coupled to and between the coupling device and the load, a power converter coupled to the DC bus, and an energy storage device coupled to the power converter, comprising:

sensing energy capacity of the energy storage device; and controlling the operation of an electric power supply for supplying power to the network when the sensed energy capacity of the energy storage device is below a predetermined limit.

26. A method of augmenting an energy storage device associated with an uninterruptable power supply system, comprising:

sensing a voltage at the energy storage device;

converting the sensed voltage into a control signal; and controlling the operation of an electric power supply as a function of said control signal to supply power to the uninterruptable power supply system to augment the energy storage device and maintain a desired D.C. bus voltage.

27. The method of claim 26, further comprising:

supplying power from the electric power supply to the energy storage device to restore the energy storage device to a fully charged state.

28. For use with an uninterruptable continuous power supply system having a first AC/DC bi-directional power converter adapted to be coupled to a primary power source, and a second AC/DC bi-directional power converter adapted to be coupled to a load, comprising:

a DC bus adapted to be coupled to and between the first and second power converters;

a secondary power source coupled to said DC bus;

a turbogenerator/motor coupled to and between said secondary power source and said DC bus;

a voltage sensor coupled to said DC bus for sensing voltage on said bus; and a controller coupled to said voltage sensor and to said turbogenerator/motor for controlling the operation of said turbogenerator/motor as a function of voltage detected by said voltage sensor.

29. The apparatus according to claim 28, further comprising a further power converter coupled between said turbogenerator/motor and said DC bus.

30. The apparatus according to claim 29, wherein said further power converter comprises an AC/DC bi-directional power converter.

31. The apparatus according to claim 28, wherein said secondary power source comprises a battery.

32. The apparatus according to claim 28, wherein said secondary power source comprises an ultracapacitor.

33. The apparatus according to claim 28, wherein said secondary power source comprises a flyhwheel.

34. A standby system for supplying power to a network when a preferred power supply system is unavailable, the network including first and second power converters adapted to be coupled between the preferred power supply system and a load, a DC bus coupled to and between the first and second power converters, and an energy storage device coupled to the DC bus, comprising:

an electric power supply adapted to be coupled between the energy storage device and the DC bus;

a sensor for sensing energy capacity of the energy storage device; and a controller coupled to said sensor and to said electric power supply for controlling the operation of said electric power supply as a function of energy capacity sensed by said sensor.

35. The standby system according to claim 34, wherein said electric power supply comprises a turbogenerator/motor.

36. The standby system according to claim 34, said electric power supply comprises a fuel cell.

37. The standby system according to claim 34, wherein said electric power supply comprises a wind turbine.

38. The standby system according to claim 34, wherein said electric power supply comprises photovoltaic cells.

39. The standby system according to claim 34, wherein said sensor comprises a voltage sensor for sensing voltage at the energy storage device.

40. The standby system according to claim 34, wherein said sensor comprises a current sensor for sensing current into or out of the energy storage device.

* * * * *